Patented Feb. 6, 1951

2,540,084

UNITED STATES PATENT OFFICE 2,540,084

METALLIC SALT OF REACTION PRODUCT OF PHOSPHORUS SULFIDE AND ALKYLATED CYCLOALIPHATIC ALCOHOL

Peter A. Asseff, Cleveland, Ohio, assignor to The Lubrizol Corporation, Wickliffe, Ohio, a corporation of Ohio No Drawing. Application May 14, 1947, Serial No. 748,111

9 Claims. (Cl. 260—429)

This invention relates as indicated to metal salts and their mode of preparation, and which is a continuation, in part and as to common subject matter, of my co-pending application Serial No. 416,604 now abandoned, which in turn was a continuation, in part and as to common subject matter, of my co-pending application Serial No. 404,361, filed July 28, 1941, now Patent No. 2,261,047.

It is a principal object of my invention to provide as a novel composition of matter certain metallic salts which while useful as addition agents in lubricating compositions as claimed in my above-identified parent application, nevertheless, have a wider field of utility. The mode of preparation of these new compositions of matter is also believed to be novel and produces materials heretofore not available.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention may be defined as comprising, as new compositions of matter, those compounds each of which may be defined as a stable, oil-soluble compound which contains:

(a) An organic radicle derived from an alkylated cycloaliphatic alcohol;
(b) A polyvalent metal;
(c) The element phosphorus; and
(d) The element sulphur.

As indicated above, my invention is also concerned with the mode of manufacture of these novel compounds.

Certain of these compounds may be considered as the polyvalent metal salts of the acid esters formed by cyclic alcohols with those acids of phosphorus which also contain sulphur.

A preferred class of compounds are those which may be produced by:

(a) Reacting together an alkylated cycloaliphatic alcohol, a reagent containing phosphorus and sulphur, and a basic polyvalent metal compound, such as for example, polyvalent metal oxide, polyvalent metal carbonate or basic polyvalent carbonate; or
(b) Reacting an alkylated cycloaliphatic alcohol with a reagent containing phosphorus and sulphur to form an acid ester either directly or by subsequent hydrolysis of the reaction product, and finally forming the polyvalent metal salt of such acid ester, either directly by reaction of the acid ester with a basic polyvalent metal compound, or indirectly by first forming an alkali metal salt and then reacting the latter by double decomposition with a water soluble polyvalent metal salt.

A preferred class of the cyclic alcohols are the cycloaliphatic alcohols and particularly those which contain the cyclohexyl nucleus, either in a non-condensed form such as may be derived by hydrogenation of the phenyl group, or in condensed form such as may be derived by hydrogenation of condensed aryl radicals such as naphthyl, anthracyl and phenanthryl.

It is also desirable that the cyclic alcohol have one or more aliphatic substituents such as for example alkyl groups, alkoxy groups, and acyl groups. A preferred class of alkyl substituents are those which contain less than six carbon atoms and particularly those which contain less than four carbon atoms.

For most purposes it is desirable to select the alcohol from the class in which the hydroxyl group is directly attached to a carbon atom which is part of a cycloaliphatic ring structure, as for example in the case of cyclohexanol and substituted cyclohexanols. However, cyclic alcohols of the naphthenyl type are also useful for the purpose of forming the compounds of this invention.

The "bridged ring" type of cycloaliphatic alcohols is also among those which are preferred, as for example those which may be considered as derivatives of pinene, limonene, camphene, etc.

Another group of cycloaliphatic alcohols which are commercially available and useful for this purpose are those which may be considered as derivatives of the terpenes, menthenes and menthanes; for example, the terpineols, menthol, etc.

From the foregoing it will be seen that those cycloaliphatic alcohols which contain:

(a) At least one cyclohexyl nucleus, and
(b) At least one alkyl radicle, and
(c) The hydroxy group directly attached to a cycloaliphatic ring structure are among the most desirable.

Among the types of alcohols which have these desirable characteristics are:

Alkylated cyclohexanols (hexahydro-alkyl phenols)
Alkylated cyclohexyl-cyclohexanols (dodecahydro-alkyl-phenyl-phenols)
Decahydro-alkyl-naphthols
Sterols A specifically preferred group of alcohols are the alkylated cyclohexanols in which substantially all of the alkyl groups have less than six carbon atoms. Specific examples of this group are:

Mono-methyl cyclohexanols
Poly-methyl cyclohexanols, e. g.—
   Dimethyl cyclohexanols
   Trimethyl cyclohexanols
Mono- and poly-ethyl cyclohexanols
Mono- and poly-propyl cyclohexanols, e. g.—
   n-Propyl cyclohexanols
   Iso-propyl cyclohexanols
Mono- and poly-butyl cyclohexanols, e. g.—
   n-Butyl cyclohexanols
   Sec-butyl cyclohexanols
   Tert.-butyl cyclohexanols
Mono- and poly-amyl cyclohexanols, e. g.—
   n-Amyl cyclohexanols
   Sec-amyl cyclohexanols
   Tert.-amyl cyclohexanols
   Iso-amyl cyclohexanols Phosphorus and sulphur are derived in accordance with this invention from phosphorus pentasulphide.

In the foregoing broad statement of this invention the addition agent has been defined in terms of its mode of preparation and desirably and necessarily so on account of the difficulty in a more precise identification of the molecule characterizing the product. As a matter of fact, the product contemplated is probably a mixture of different constituents and it is for this reason that the same is best defined, as above indicated, in terms of its mode of preparation.

Referring more specifically to the metallic salts prepared from phosphorus pentasulphide, these products may be prepared as indicated by reacting phosphorus pentasulphide with a cycloaliphatic alcohol in the preparation of an intermediate acidic reaction product and the polyvalent metal salt then prepared of such acidic reaction product.

Alternatively, and as likewise indicated above, the final product may be prepared in a single step or in concurrent steps by reacting together phosphorus pentasulphide, the alcohol, and polyvalent metal oxide. In this case, it is probable that the reaction which forms the intermediate acidic reaction product, and the reaction of such acidic reaction product with polyvalent metal oxide to form the final salt, take place simultaneously.

The following is an inclusive list of cycloaliphatic alcohols which may be used in carrying out this invention:

Methyl cyclohexanol
Ethyl cyclohexanol
Propyl cyclohexanol
Butyl cyclohexanol
Amyl cyclohexanol
Sterols, e. g.—"Cosmol" alcohol (a cyclic alcohol derived from wool-fat)
Cholesterol
Cyclohexanol
Borneol
Fenchyl alcohol
Methyl cycloheptanol
Methyl cyclopentanol
Cycloheptanol
Cyclopentanol
Octyl cyclohexanol
Decyl cyclohexanol
Lauryl cyclohexanol
Cetyl cyclohexanol
Cyclohexyl cyclohexanol
Menthol
Terpineols Additional examples of cycloaliphatic alcohols which are useful for this purpose are:

Poly-alkylated cyclohexanols; e. g.—
   Dimethyl cyclohexanol
   Diethyl cyclohexanol
   Dipropyl cyclohexanol
   Dibutyl cyclohexanol
   Diamyl cyclohexanol
   Trimethyl cyclohexanol
   Tetra-methyl cyclohexanol
   Triethyl cyclohexanol
   Tetraethyl cyclohexanol
   Tripropyl cyclohexanol
   Tetrapropyl cyclohexanol
Cyclo-alkyl substituted aliphatic alcohols, e. g.—
   Cyclohexyl methanol (hexahydro benzyl alcohol)
   Cyclohexyl ethanol
   Cyclohexyl propanol
Naphthenyl alcohols, i. e. alcohols produced by reduction of naphthenic acids
Alkylated:
   Hydrogenated naphthols, e. g.—
     Ac-tetrahydro-$\alpha$-naphthol
     Ac-tetrahydro-$\beta$-naphthol
     Decahydro-$\alpha$-naphthol
     Decahydro-$\beta$-naphthol
Alkylated: hydrogenated anthranol
Alkylated: hydrogenated anthrol
Alkylated:
   Poly-hydric cycloaliphatic alcohols, e. g.—
     Hydrogenated poly-hydroxy benzenes, such as:
       Hexahydro-catechol
       Hexahydro-resorcinol
       Hexahydro-hydroquinone The cycloaliphatic alcohols which may be used in this way include those which have substituent groups in addition to hydrocarbon substituents. The presence of such additional substituent groups is sometimes advantageous for particular purposes. Examples of such additional substituents are:

Organic substituents, e. g.—

$$R-O- \text{ and } R-O-R'-$$
$$R-\overset{O}{\underset{\|}{C}}- \text{ and } R-\overset{O}{\underset{\|}{C}}-R'-$$
$$R-O-\overset{O}{\underset{\|}{C}}- \text{ and } R-O-\overset{O}{\underset{\|}{C}}-R'- \text{ and } R-\overset{O}{\underset{\|}{C}}-O-R'-$$

where R is:

(a) Alkyl, such as—

| | |
|---|---|
| Methyl | Amyl |
| Ethyl | Lauryl |
| Propyl | Cetyl |
| Butyl | |

(b) Cycloalkyl, such as—

| | |
|---|---|
| Cyclohexyl | Naphthenyl |
| Cycloheptyl | |

(c) Aryl, such as—

| | |
|---|---|
| Phenyl | Tolyl |
| Naphthyl | Xylyl |
| Xenyl | | and R' is a divalent hydrocarbon radicle, e. g.—
—$(CH_2)_n$—such as—
- Methylene
- Ethylene
- Propylene
- phenylene, —$C_6H_4$—

Inorganic substituents, e. g.—
- Cyanide (nitrile)
- The halogens
  - Fluorine
  - Chlorine
  - Bromine
  - Iodine
- Radicles derived from inorganic oxy acids, such as—
  - Sulphate
  - Sulphite
  - Sulphonic acid
  - Sulphinic acid
  - Sulphenic acid
  - Nitrate
  - Nitrite
  - Nitro
  - Nitroso
  - Phosphate
  - Phosphite
  - Cyanate and iso-cyanate
- Radicles derived from inorganic thio-acids, such as—
  - Thiosulphate
  - Thiophosphate
  - Thiophosphite
  - Thiocyanate and iso-thiocyanate
- Sulphide, polysulphide, and hydrosulphide Additional examples of substituent groups are the groups obtained by substituting sulphur for one or more of the oxygen atoms in the substituents listed under "organic substituents."

It is not necessary that the cycloaliphatic alcohol used for this purpose be a pure compound. It may consist of a mixture of cycloaliphatic alcohols and such mixtures are often particularly advantageous. An example of such material is the mixture of alcohols resulting from the hydrogenation of commercial Cresol. The "methyl cyclohexanol" referred to hereafter is the product thus obtained. A mixture of alkylated cyclohexanols consisting principally of ethyl and propyl cyclohexanols has also been found particularly suitable for this purpose.

The cycloaliphatic alcohols which contain the cyclohexane nucleus, for example the alkylated cyclohexanols, are particularly useful cycloaliphatic alcohols for my purpose because they are commercially available and produce a product which has advantageous properties.

Of the cycloaliphatic alcohols in general those are preferred which have a total of less than ten carbon atoms. The alkylated cycloaliphatic alcohols are particularly suitable. In this case, it is best to have the alkyl group contain less than six and preferably less than four carbon atoms.

Another advantageous class of alcohols suitable for this purpose are those which contain more than one cycloaliphatic nucleus, either in the form of condensed rings or in the form of separate rings. Examples of such alcohols are the alkylated decahydro-naphthols and the alkylated dodecahydro-phenyl-phenols (cyclohexyl-cyclohexanols).

Those cycloaliphatic alcohols which contain an aromatic substituent may also be used. Examples of these are the alkyl-substituted: phenyl-cyclohexanols, benzyl cyclohexanols, tolyl-cyclohexanols, and benzoyl cyclohexanols.

While for most purposes I prefer to use those cycloaliphatic alcohols in which the hydroxyl group is directly attached to a carbon atom which is part of a cycloaliphatic nucleus, it is sometimes desirable to use cycloaliphatic alcohols which have the hydroxyl group attached to a carbon atom which is part of a chain structure. Examples of the latter are the alkylated naphthenyl alcohols and α-terpineol.

As will be pointed out more specifically hereinafter, of the polyvalent metals which are suitable for use in accordance with this invention, zinc has been found to be of particular value. However, it will be understood that polyvalent metals other than zinc, are likewise of utility. Among such metals are cadmium, magnesium, calcium, barium, strontium, mercury, copper, aluminum, lead, tin, chromium, manganese, iron, cobalt and nickel. The oxides, carbonates, basic carbonates, and hydroxides of the foregoing metals are the most convenient basic materials with which to produce the salts contemplated. Procedures involving double decomposition with the sodium salt of the acidic reaction product of $P_2S_5$ with the alcohol may be substituted, however, for the direct neutralization reactions above contemplated, Since a specific example of the new materials of the present invention which has been found of especial utility is the zinc salt of the acidic reaction product obtained by reacting phosphorus pentasulphide with methyl cyclohexanol, the details of the manufacture of such material will be given as illustrative of the mode of manufacture of the similar materials comprised within the broad statement of the invention.

This process may be divided into two parts, i. e.

(a) The preparation of the acid ester, and
(b) The preparation of the metallic salt of such acid ester.

(a) PREPARATION OF THE ACID ESTER

Five moles of methyl cyclohexanol and one mole of $P_2S_5$ were mixed with an amount of benzene equal in volume to the amount of cyclohexanol and placed in a flask equipped with a reflux condenser, a thermometer and a mechanical stirrer. The flask was placed in a water bath at approximately 100° F. and refluxed for four hours. The batch was then cooled to about 60° C. and washed once with an equal volume of water at 60° C. The benzene was removed from the wash material by distillation at atmospheric pressure. A typical batch of the preparation of the acid ester in the mode above defined was as follows:

Wt. of methyl cyclohexanol_____grams__ 500
Moles of methyl cyclohexanol_____ 4.39

Weight of P₂S₅ _____ grams__ 195.5
Moles of P₂S₅ _____ .88
C. c. of benzol used as solvent_____ 500
C. c. of 60° C. H₂O used in washing_____ 1000
Weight of product _____ grams__ 616
Temp. of reaction, °C.:
    Bath temp_____ 100
    Vapor temp_____ 80
Time of reaction_____hours__ 4

It is believed that the reaction between phosphorus pentasulphide and the alcohol produces a mixture of compounds of the type represented by acid thiophosphate esters. For example:

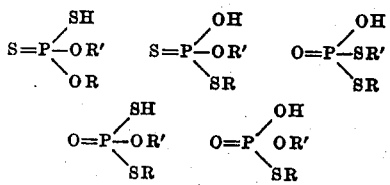

where:
R is the cyclo-aliphatic radicle derived from the alcohol
R' is hydrogen or R The final product, if this assumption is correct, would then consist of the salts derived from the acid ester by replacing the replaceable hydrogen of such esters with zinc. Careful analysis shows that the first of the above formulas probably represents the principal constituent.

(b) PREPARATION OF THE METALLIC SALT

*First method*

The acid ester resulting from step (a) above was mixed with enough water to make a 15–20% mixture. This solution was made neutral to phenolphthalein with 30% aqueous caustic. The acid was neutralized at 80–90° C. To the soda-salt solution was added an aqueous solution of zinc chloride. The reaction mixture was stirred at 80°–90° C. for fifteen minutes, and then allowed to settle. The time required for the separation of the water from the salt was about fifteen minutes. The water was then poured off and the zinc salt dissolved in twice its volume of benzene. The water and benzene were removed by vacuum distillation at about seven inches vacuum. The maximum temperature of distillation was 100° C. A typical batch in the preparation of the zinc salt of the reaction product of phosphorus pentasulphide and methyl cyclohexanol was as follows:

Grams of salt obtained_____ 980
Per cent yield_____ 89.5
Time of reaction between
  NaOH and acid_____ 15 minutes
Time of reaction between Na
  salt and ZnCl₂_____ 15 minutes
Temperature of reaction, °C.:
  NaOH+acid _____ 80–90
  Na salt+ZnCl₂_____ 80–90
C. c. of benzol used for dehydration _____ 2000
Temperature of dehydration__ 100° C. maximum
Pressure of dehydration_____ 23″ of Hg

*Second method*

Grams
Methyl cyclohexanol _____ 865
Phosphorus pentasulphide _____ 333
Zinc oxide _____ 100

The methyl cyclohexanol and zinc oxide are placed in a container and heated to 180° F. Then the phosphorus pentasulphide is added in finely divided form so that it will pass a 40 mesh screen. The phosphorus pentasulphide is added over a period of about 40 minutes so that the temperature does not exceed 212° F. The temperature is then raised to 320° F. over a period of one hour and maintained at that temperature for an additional one-half hour. The yield of product is 1167 grams, and may be:

(a) Dissolved in an equal weight of mineral oil and filtered hot after the addition of 2% by weight of a filter aid such as Filtrol; or
(b) Dissolved in an equal weight of benzol, filtered, and the benzol removed by evaporation under vacuum.

*Third method*

The materials and the amounts are the same in this method as in the second method. The methyl cyclohexanol and phosphorus pentasulphide are mixed in a flask and maintained at a temperature of 212° F. by means of a water bath for seven hours. The zinc oxide is then added, and the temperature raised over a period of one hour to 320° F., and maintained at that temperature for one hour. The yield is 1170 grams, and the final solution and purification may be the same as for the second method.

*Fourth method*

Pounds
Methyl cyclohexanol _____ 2975
Phosphorus pentasulphide _____ 1137.5
Zinc oxide _____ 391

The methyl cyclohexanol and phosphorus pentasulphide are heated to 210° F., and the temperature is maintained there for five and one-half hours. The pressure is then reduced to give a vacuum equivalent to five inches of mercury, absolute pressure, for one-half hour to remove the unreacted alcohol, hydrogen sulphide, etc. The mixture is cooled to 140° F. and zinc oxide added. The temperature is maintained at 140° F. for three hours. A vacuum equivalent to three inches of mercury, absolute pressure, is applied and the temperature raised to 210° F., and that temperature maintained for nine hours. Three thousand pounds of a neutral oil are added together with 2% of filter aid, and the solution is filtered at a temperature of about 200° F. The yield of product, exclusive of the oil, is 3800 pounds.

Generally, these reaction products are prepared by mixing the reactants and exposing the mixture to reaction conditions which produce the primary reaction product without any substantial decomposition of such primary reaction product.

The sulphur reactivity test is run as follows:
1.5 grams of the compound are weighed to the nearest .1 milligram into a glass-stoppered, wide-mouthed Erlenmeyer flask equipped with a reflux condenser and a stirring device. 100 ml. of solvent and two 1″ square pieces of 40 mesh copper gauze [1] are then added. The solution is maintained at the desired temperature by placing the flask in a constant temperature bath; or, if preferred, the temperature may be controlled by selecting a solvent having a boiling point at the ---
[1] The copper is cleaned, before using, by heating to a cherry red and immersing in methyl alcohol.

desired temperature and heating the flask until refluxing takes place. The solution is refluxed for two hours and a third piece of copper gauze is added and the refluxing continued for 30 minutes. This process is repeated until the last piece of gauze added remains bright for the entire 30 minute reflux period.

The solvent is removed by decantation and the flask and gauze are washed with acetone and dried. During the washing, care must be taken to prevent loss of CuS which flakes off the gauze pieces. The washed and dried flask containing the reacted copper gauze is transferred to an air-tight system and $H_2S$ is liberated by treating the gauze with HCl. The evolved $H_2S$ is absorbed in $CdCl_2$ solution. When no more $H_2S$ is evolved, the system is swept with nitrogen. The $CdCl_2$ is then made just acid to litmus with HCl and titrated with standard iodine solution using starch as an indicator.

The solvents used, together with the results of the active sulfur tests are shown on the following table.

TABLE A

| Solvent | Reflux Temp. | Active Sulfur at Temperature Shown |
|---|---|---|
| | °C. | Per Cent |
| 50% Benzol—50% acetone | 70–75 | 0 |
| Toluol | 110 | .02 |
| Xylol | 144 | .09 |
| Octyl Alcohol | 175 | 1.21 |
| Ortho dichlor benzene | 181 | 1.56 |
| 1,2,4 trichlor benzene | 213 | 1.61 |
| Hexachlor diphenyl oxide [1] | 250 | 5.80 |
| Hexachlor diphenyl oxide [2] | 300 | 5.65 |

[1] Solutions not refluxed.
[2] Compound decomposed completely, forming tars which coated Cu gauze and prevented proper reaction.

One of the particular uses of the materials comprising the present invention is in lubricating compositions, and for specific data as to the effect of the same in lubricating compositions, reference may be had to the specification of my parent application which is now Patent No. 2,261,047, dated October 28, 1941.

In addition to their utility in lubricating compositions, the materials of this invention will be found useful as corrosion inhibitors in the protection of metal surfaces generally—for example, in paint compositions; in cleaning compositions; and in solvents generally.

It will be noted that the new materials of this invention contain, in a single compound, the combination of an alkylated cycloaliphatic radicle, a thiophosphate radicle, and a polyvalent metal. It has been discovered that this combination of constituents produces a material having a particularly desirable combination of properties for use in lubricating oil to be used in the crankcases of internal combustion engines under conditions of severe service. This combination of properties includes the following:

(1) High solubility in oils of high viscosity index;
(2) Detergent action or resistance to sludge-forming tendencies;
(3) Controlled sulphur activity, contributing corrosion-inhibiting properties and resistance to the formation of acidic materials during oxidation; and
(4) Ability to increase film strength of the oil.

In the past, it has not been found possible to compound addition agents which would reduce corrosive tendencies, and the tendency to produce acidic materials during oxidation, without increasing the tendency to form deleterious deposits. By the use of the addition agents of this invention, however, the corrosive tendency and the formation of acidic materials are reduced while, at the same time, reducing the tendency to form harmful deposits.

Another example of my new composition is the cobaltous salt of the acidic reaction product of $P_2S_5$ and hydrogenated amyl phenol, or as otherwise known, amyl cyclohexanol. Such material may be conveniently produced in accordance with the following:

800 grams of amyl cyclohexanol and 211 grams of $P_2S_5$ are mixed in 1000 cc. of benzene, and the mixture refluxed for about 4 hours. The resultant product in benzene solution is washed with warm water, four times in the instant case. The benzene was removed by distillation under vacuum leaving a residue of 920 grams of product.

200 grams of the foregoing acidic reaction product were neutralized with aqueous sodium hydroxide solution at a temperature of 90° C., using an equivalent amount of sodium hydroxide. To the neutralized mixture was added an equivalent amount of cobaltous chloride ($CoCl_2$). The resultant oil layer product comprising the cobaltous salt was dissolved in benzene and washed with water. Water and benzene were then removed by ordinary distillation methods, preferably under vacuum.

209 grams of the cobalt derivative were obtained analyzing 9.5% sulphur, 5.3% phosphorus, and 13.7% cobalt. The product was oil-soluble at 1% concentration in a refined mineral oil.

The foregoing example is typical of production of metallic salts by double decomposition from the sodium salt of the acid.

Another polyvalent metallic salt is the barium salt of the acidic reaction product of $P_2S_5$ with tertiary butyl cyclohexanol. Such salt may be conveniently produced in accordance with the following:

5 moles of tertiary butyl cyclohexanol and 1 mole of $P_2S_5$ are heated together for 4 hours at 100° C. A solid product is obtained which is dissolved in benzene, washed, and the solvent removed.

438 grams of this acid, 100 grams of methyl cyclohexanol, 100 cc. of methanol, 74 grams of barium oxide (5% excess by weight BaO) are heated together for a period of 1 hour at 60° C. At the end of this period, the temperature is increased to 100° C. and maintained there for an additional 1 hour. Following this, the pressure on the system is reduced to 5″ Hg absolute pressure to remove solvents.

The resultant product was dissolved in a light mineral oil (about SAE 10) and filtered using "Hyflo." The filtrate was the product and was obtained in a yield of 86%, or 860 grams.

This product was oil-soluble and analyzed 5.85% sulphur, 2.84% phosphorus and 5.95% barium.

The following table gives additional examples of polyvalent metal salts of the acidic reaction product of $P_2S_5$ and methyl cyclohexanol. In the column headed "Additional alcohol percent based on final composition," the indicated percent of alcohol was added for purposes of aiding solution in mineral oil. The analyses are results obtained upon analysis of the final composition.

TABLE I

| Metal | Mole ratio of alcohol to P₂S₅ | Source of Polyvalent Metal | Method Used¹ | Additional alcohol per cent based on final composition | Analysis of final composition S | Analysis of final composition P | Analysis of final composition Metal | Mineral Oil |
|---|---|---|---|---|---|---|---|---|
| | | | | | Per cent | Per cent | Per cent | Per cent |
| Aluminum | 5:1 | Al₂(SO₄)₃ | dd | none | 10.6 | 7.7 | 3.2 | |
| Barium | 5:1 | Ba(OH)₂ | dn | 7.3% methyl cyclohexyl | 5.8 | 3.0 | 6.0 | 50 |
| Bismuth (ic) | 5:1 | Bi₂O₃ | dn | 10% methyl cyclohexyl | 7.3 | 3.8 | 7.2 | 50 |
| Calcium | 5:1 | Ca(OH)₂ | dn | 12% methyl cyclohexyl | 6.2 | 2.9 | 1.6 | 62 |
| Cadmium | 5:1 | Cd(NO₃)₂ | dd | none | 11.5 | 7.0 | | |
| Cobalt (ous) | 5:1 | CoCl₂·6H₂O | dd | do | 7.4 | 3.8 | 3.1 | 50 |
| Copper (ic) | 5:1 | CuO | dn | do | 7.7 | 3.9 | 3.3 | 50 |
| Iron (ic) | 5:1 | Fe₂O₃ | dn | 23% methyl cyclohexyl | 6.4 | 3.1 | 1.6 | 54.5 |
| Mercury (ic) | 5:1 | HgO | dn | none | 6.7 | 3.5 | 9.8 | 50 |
| Magnesium | 5:1 | Mg salt | dd | do | | 7.9 | 3.1 | |
| Manganese | 5:1 | MnO₂ | dn | do | 8.2 | 4.0 | 1.6 | 50 |
| Nickel | 5:1 | Ni(NO₃)₂·6H₂O | dd | do | 7.6 | 3.7 | 3.3 | 50 |
| Lead | 5:1 | basic carbonate | dd | 13% methyl cyclohexyl | 6.8 | 3.4 | 8.7 | 56 |
| Tin (ous) | 5:1 | SnCl₂ | dd | none | 6.7 | 3.7 | 9.3 | 50 |
| Strontium | 4:1 | Sr(OH)₂·8H₂O | dn | 10% methyl cyclohexyl | 6.8 | 3.3 | 4.1 | 50 |
| Zinc | 5:1 | ZnCl₂ | dd | none | 13.5 | 8.4 | 10.1 | |
| Zinc | 5:1 | ZnCO₃ | dd | do | 11.3 | 8.0 | 9.4 | |
| Zinc | 5:1 | ZnO | dn | do | 7.8 | 4.0 | 3.9 | 50 |

¹ dd indicates "double decomposition" from sodium, or alkali metal salt; dn indicates "direct neutralization."

The terms "alkyl" and "alkylated" as used herein are intended to include substituents, and substitution of substituents, of the cyclo-alkyl type as well as the straight chain type.

The terms "propyl," "butyl," and "amyl" as used herein are intended as inclusive terms defining all of the alkyl groups with the indicated number of carbon atoms (that is, 3, 4, and 5 carbon atoms respectively). For example, propyl is intended to be inclusive of propyl and iso-propyl; butyl of normal butyl, secondary butyl, iso-butyl, and tertiary-butyl; and amyl of normal, secondary normal, primary iso, secondary iso, the tertiary-amyl, and the di-ethyl-methyl groups.

The compositions of matter of this invention include the compounds derived from alkylated cycloaliphatic alcohols which include substituents in addition to the alkyl groups. Organic radicals in the ultimate composition may contain both alkyl groups and other substituents attached to the cycloaliphatic nucleus. There may be also a plurality of alkyl groups of the same or different identity and a plurality of other substituents of the same or different identity attached to the same or different cycloaliphatic nuclei.

Other modes of applying the principle of the invention may be employed, change being made as regards the details described, provided the features stated in any of the following claims or the equivalent of such be employed.

I therefore particularly point out and distinctly claim as my invention:

1. As a new composition of matter, the zinc salt of di(methylcyclohexyl) dithiophosphate.

2. As a new composition of matter, the product obtained by reacting together zinc oxide, phosphorus pentasulphide, and an alkylated cycloaliphatic alcohol.

3. As a new composition of matter, the product obtained by reacting together zinc oxide, phosphorus pentasulphide, and an alkylated cycloaliphatic alcohol in which substantially all of the alkyl groups have less than six carbon atoms.

4. As a new composition of matter, the product obtained by reacting together zinc oxide, phosphorus pentasulphide, and an alkylated cycloaliphatic alcohol having the hydroxyl group directly attached to a cycloaliphatic ring carbon atom.

5. As a new composition of matter, the product obtained by reacting together zinc oxide, phosphorus pentasulphide, and an alkylated cyclohexanol.

6. As a new composition of matter, the product obtained by reacting together zinc oxide, phosphorus pentasulphide, and methyl cyclohexanol.

7. The method of producing a salt-ester of a thiophosphoric acid which comprises reacting a polyvalent metal compound of the class consisting of the oxides, carbonates, basic carbonates, and hydroxides, with the reaction product of phosphorus pentasulphide and an alkylated cycloaliphatic alcohol in which substantially all of the alkyl groups have less than six carbon atoms.

8. As a composition of matter, a salt ester of a thiophosphoric acid produced by the method which comprises reacting a polyvalent metal compound of the class consisting of oxides, carbonates, basic carbonates, and hydroxides with the reaction product of phosphorus pentasulphide and an alkylated cycloaliphatic alcohol in which substantially all of the alkyl groups have less than six carbon atoms.

9. As a composition of matter, a salt ester of a thiophosphoric acid produced by the method which comprises reacting a basic polyvalent metal compound of the class consisting of oxides, carbonates, basic carbonates, and hydroxides with the reaction product of phosphorus pentasulphide and an alkylated cycloaliphatic alcohol in which substantially all of the alkyl groups have less than six carbon atoms.

PETER A. ASSEFF.

REFERENCES CITED

The following references are of record in the file of this patent:

UNITED STATES PATENTS

| Number | Name | Date |
|---|---|---|
| 2,261,047 | Asseff | Oct. 28, 1941 |
| 2,364,283 | Freuler | Dec. 5, 1944 |
| 2,369,632 | Cook et al. | Nov. 13, 1945 |